Feb. 22, 1966     F. H. VAN WINSEN     3,236,514
WHEEL SUSPENSION
Filed Jan. 10, 1963
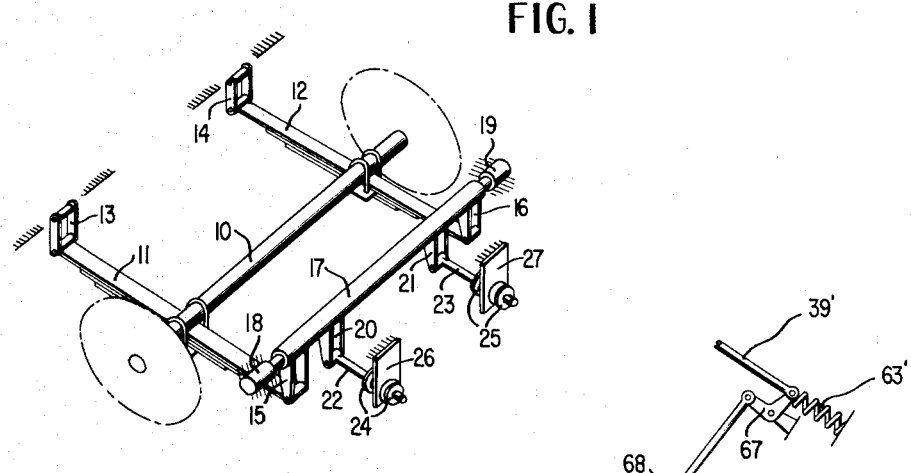
FIG. 1
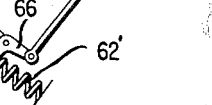
FIG. 4
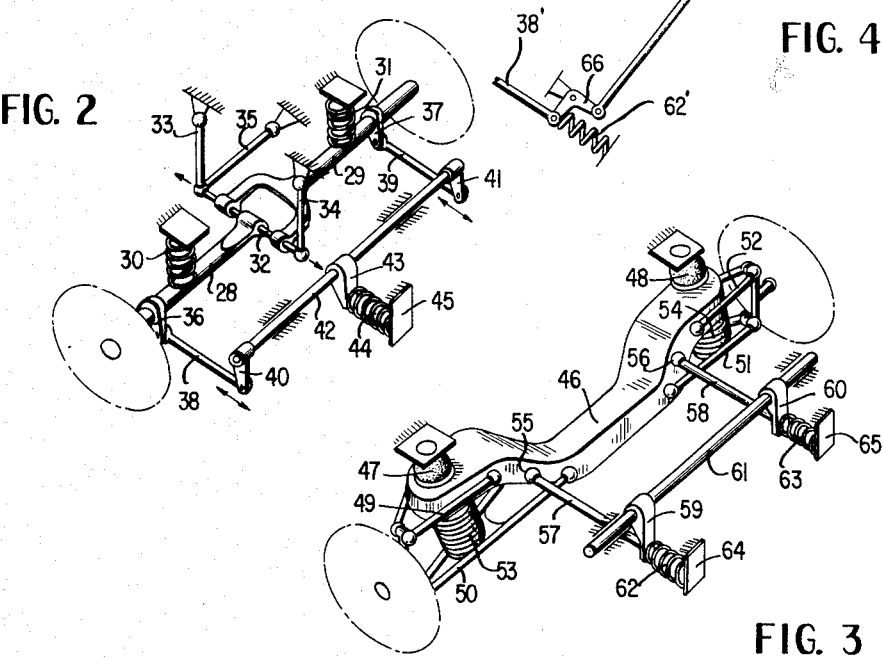
FIG. 2
FIG. 3
INVENTOR.
FRIEDRICH H. VAN WINSEN
BY *Dicke & Craig*
ATTORNEYS.

United States Patent Office 3,236,514
Patented Feb. 22, 1966

3,236,514
WHEEL SUSPENSION
Friedrich H. van Winsen, Kirchheim, Teck, Germany, assignor to Daimler-Benz Aktiengesellschaft, Stuttgart-Unterturkheim, Germany
Filed Jan. 10, 1963, Ser. No. 250,643
Claims priority, application Germany, Jan. 19, 1962, D 37,954
7 Claims. (Cl. 267—11)

The present invention relates to a wheel suspension, and more particularly, to a wheel guidance system, especially for motor vehicles, in which the longitudinal forces acting on the wheels are absorbed springily or elastically in such a manner that two wheels of an axle or of a respective pair of oppositely disposed wheels forcibly carry out relative movements with respect to the vehicle in the longitudinal direction in the same direction and by the same amount.

In the interest of a soft transmission of longitudinal forces and shocks from the running wheels to the vehicle body, especially also with a view to as large as possible a suppression of vibrations and noises which may be caused by such longitudinal forces and shocks within the vehicle body, the wheel guidance may be so constructed that the longitudinal forces acting on the wheels are absorbed in a springy or elastic manner. However, the known prior art constructions of this type entail the disadvantage that in by far the most cases, namely, when only one wheel encounters an obstruction and not both wheels together simultaneously encounter such obstruction, this one wheel, while elastically deflected in the longitudinal direction, causes the axle to cant, that is, assume an inclined position and therewith results in an undesirable steering effect.

In order to avoid such disadvantage, there is proposed in accordance with the present invention a linkage which forcibly guides the two wheels of an axle, that is, of a pair of oppositely disposed wheels, as regards relative movements with respect to the vehicle in the longitudinal direction, in the same direction and by the same amount. If both wheels of an axle, that is, of a pair of oppositely disposed wheels, carry out equal deflections in the longitudinal direction, then the axle as a whole stands again exactly in the vehicle transverse direction, and an accurate straight driving is assured thereby.

The connecting linkage in accordance with the present invention may include a torsionally resistant shaft extending, for example, in the vehicle transverse direction from which extends, within the area of the right and left vehicle half, one arm each rigidly secured thereto and in the same direction, and more particularly substantially in a vertical direction, whereby this arm is operatively connected in a pivotal manner with the part of the axle arrangement supporting the wheels which is disposed on the side of the respective vehicle half.

The spring system for the absorption of the longitudinal forces may also act directly at the vehicle axle itself. However, for space reasons, it is recommended in accordance with the present invention that the spring system acts against the shaft extending in the vehicle transverse direction, for example, in such a manner that one or several further arms are rigidly connected with the shaft which, in turn, are supported at the vehicle by way of springs, for example, rubber springs.

The present invention may be realized in combination with the most varied wheel suspensions, for example, in combination with a rigid axle and longitudinal leaf springs, in combination with a swinging half-axles which pivot about a single pivot shaft which, in turn, is suspended longitudinally displaceable at the vehicle by means of a parallelogram guide means, or also in combination with an axle cross bearer elastically connected with the vehicle at which are pivotally connected the wheels by means of cross guide members.

Of course, the connecting linkage to be used in accordance with the present invention may possess any suitable desired form or shape. For example, the connecting linkage may be so constructed that one linkage part each, extending in the longitudinal direction, leads away from the part of the axle unit or axle arrangement carrying the wheels located on the right and on the left vehicle half which linkage part engages with the other end thereof the arm of a respective bell crank extending outwardly in the vehicle transverse direction from a vertical axis of rotation, while the other arms of the bell cranks extending in opposite directions in the vehicle longitudinal direction are operatively connected by means of a rod or the like.

Accordingly, it is an object of the present invention to provide a wheel suspension of the type mentioned hereinabove which is operable to absorb the longitudinal forces and shocks acting on the wheels of the vehicle without the shortcomings and drawbacks encountered with the prior art constructions.

It is another object of the present invention to provide a wheel suspension and guide system for vehicles, especially of motor vehicles, which is operable to absorb, in a very soft manner, longitudinal forces and shocks that act on the wheels of the vehicle to suppress as far as possible vibrations and noises caused thereby without producing any steering effects as a result of such absorption.

A further object of the present invention resides in the provision of a wheel suspension and guide system in which the absorption of longitudinal forces and shocks acting on the wheels is realized in such a manner that both wheels of a pair of oppositely disposed wheels are forced to carry out identical relative movements in the longitudinal direction with respect to the vehicle superstructure.

Still another object of the present invention resides in the provision of a wheel guide arrangement for a wheel of an axle in which longitudinal forces and shocks are absorbed in a highly effective manner without adversely affecting the guidance of the wheels.

Still a further object of the present invention resides in the provision of a wheel guide arrangement for the wheels of a motor vehicle operable to absorb longitudinal shocks in an effective manner without the aforementioned disadvantages, yet requiring relatively little space, and which additionally is simple in construction and is readily applicable to any type of wheel suspension.

These and other objects, features and advantages of the present invention will become more obvious from the following description when taken in connection with the accompanying drawing which shows, for purposes of illustration only, several embodiments in accordance with the present invention, and wherein FIGURE 1 is a perspective view of a wheel guide arrangement in accordance with the present invention in combination with a rigid axle, FIGURE 2 is a perspective view of a modified embodiment of a wheel guide arrangement in accordance with the present invention in combination with swinging half-axles, FIGURE 3 is a perspective view of a still further modified embodiment of a wheel guide arrangement in accordance with the present invention in combination with wheels independently suspended from an elastically mounted axle cross bearer, and FIGURE 4 is a partial plan view of a modified arrangement of the connecting linkage for the wheel guide arrangement of FIGURES 1 to 3 in accordance with the present invention.

Referring now to the drawing wherein like reference numerals are used throughout the various views to designate like parts, and more particularly to FIGURE 1, reference numeral 10 designates therein a rigid axle of conventional construction. The longitudinal leaf springs 11 and 12 are secured at the rigid axle 10 in the usual manner. One end of these leaf springs 11 and 12 is pivotally connected by way of shackles 13 and 14 with the vehicle superstructure, such as the frame or body of a self-supporting type body construction. The other end of the leaf springs 11 and 12 is operatively connected by way of pivotal bearings with arms 15 and 16 which are rigidly secured at the connecting shaft 17 extending in the vehicle transverse direction. The shaft 17 is rotatably supported at the vehicle in any suitable known manner, as schematically indicated at 18 and 19. Further arms 20 and 21 rigidly secured at the shaft 17 are operatively connected by way of rods 22 and 23 with the rubber springs 24 and 25 which are supported at the vehicle as schematically indicated at 26 and 27.

As may be readily seen from FIGURE 1, the wheels and therewith the axle 10 and the springs 11 and 12 may carry out elastic deflections in the longitudinal direction whereby the shaft 17 is rotated and thereby serves, on the one hand, for the synchronization of the horizontal longitudinal movements of both wheels and, on the other, is utilized for the transmission of the resistance of the springs 24 and 25 against the longitudinal displacements.

In the wheel guide system of FIGURE 2, two swinging half-axles 28 and 29 are utilized which are spring supported at the vehicle by way of coil springs 30 and 31. The swinging half-axles 28 and 29 pivot about a common pivot shaft 32 extending in the vehicle longitudinal direction which is suspended at the vehicle from two vertical guide members 33 and 34. A further horizontal guide member 35 supports the pivot shaft 32 in the vehicle transverse direction. The joints at both ends of the guide members 33, 34 and 35 are schematically indicated in FIGURE 2 as ball joints, but in actual construction may, of course, also be replaced by any suitable rubber joints of conventional construction. As a result of the illustrated parallelogram-like suspension of the pivot shaft 32, it is possible for this shaft 32 to carry out deflection in the vehicle longitudinal direction as indicated in this figure by arrows. Longitudinal struts or rods 38 and 39 are pivotally connected with arms 36 and 37 securely fastened to the swinging half-axles 28 and 29. The struts 38 and 39 are operatively connected at the opposite ends thereof by way of arms 40 and 41 with a connecting shaft 42 extending in the vehicle transverse direction. This connecting shaft 42 is supported at the vehicle, as regards rotary movements thereof, by way of an arm 43 and a spring 44, as schematically indicated at 45. The function and operation of the arrangement illustrated in FIGURE 2 which in principle corresponds to FIGURE 1 as regards the synchronization of the longitudinal movements of the wheels, is also believed obvious from the foregoing description when taken in connection with the accompanying drawing.

In the embodiment of the wheel guide system of FIGURE 3 there is provided an axle cross bearer 46 which itself is secured at the vehicle superstructure, such as the main frame or body parts of a self-supporting-type body construction, by way of elastic rubber bearings 47 and 48 of any known construction. The wheels are pivotally suspended from this cross bearer 46 in the usual manner by means of superposed double guide arms 49, 50, 51 and 52. The spring support of the spring deflections or stroke movements of the wheels takes place by way of coil springs 53 and 54. Thrust rods 57 and 58 are pivotally secured at their ends 55 and 56 to the cross bearer 46 which thrust rods 57 and 58 are similarly pivotally secured at their other ends to arms 59 and 60 which are connected with a connecting shaft 61 extending in the vehicle transverse direction. Springs 62 and 63 engage at the arms 59 and 60, while the opposite ends of the springs 62 and 63 are supported at the vehicle as indicated at 64 and 65. It is also believed again quite obvious from this fingure that the wheels of this embodiment are able to carry out certain longitudinal displacements or deflections, that, however, by reason of the connection by means of the connecting shaft 61 the axle cross bearer 46 cannot carry out any swinging movements about the vertical axis and cannot, therefore, come into an undesired inclined position.

FIGURE 4 illustrates how the movements of the parts 11, 12; 38, 39; or 57, 58 of FIGURES 1 to 3 may also be operatively connected with each other in the same manner as the corresponding parts 38', 39', and more particularly, by bell cranks 66 and 67 which are operatively connected with each other by a rod or linkage 68. The connections of FIGURE 4 may also include the springs 62', 63' corresponding to springs 24, 25 of FIGURE 1 and to springs 62, 63 of FIGURE 3.

While I have shown and described several embodiments in accordance with the present invention, it is understood that the same is not limited thereto but is susceptible of numerous changes and modifications within the spirit and scope thereof, and I therefore do not wish to be limited to the details shown and described herein but intend to cover all such changes and modifications as are encompassed by the scope of the appended claims.

I claim:

1. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half axles and means pivotally connected to said half axles and to said superstructure connecting said axles with said superstructure, said means being capable of executing movements in the longitudinal vehicle direction with respect to said superstructure, and connecting linkage means operatively connecting said half-axles to forcibly guide the same, as regards relative movements with respect to the vehicle in the longitudinal direction, substantially in the same direction and substantially by the same amount, said connecting linkage means including a torsion resistant shaft rotatably mounted on said superstructure and extending substantially in the vehicle transverse direction, arm means rigidly connected to said shaft and extending therefrom on each side of the vehicle and further connecting rod means extending substantially in the longitudinal direction and pivotally connected at one end thereof with said arm means and at the opposite end thereof with a respective swinging half axle in proximity to the corresponding wheel.

2. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half axles and means pivotally connected to said half axles and to said superstructure connecting said axles with said superstructure, said means being capable of executing movements in the longitudinal vehicle direction with respect to said superstructure, and connecting linkage means operatively connecting said half-axles to forcibly guide the same, as regards relative movements with respect to the vehicle in the longitudinal direction, substantially in the same direction and substantially by the same amount, said connecting linkage means including a torsion resistant shaft rotatably mounted on said superstructure and extending substantially in the vehicle transverse direction, arm means rigidly connected to said shaft and extending therefrom on each side of the vehicle, and further connecting rod means extending substantially in the longitudinal direction and pivotally connected at one end thereof with said arm means and at the opposite end thereof with a respective swinging half axle in proximity to the corresponding wheel, further arm means connected to said shaft, and spring means elastically supporting said further arm means against said vehicle superstructure for absorbing said longitudinal forces.

3. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half axles and parallelogram guide means pivotally connected to said half axles and said superstructure suspending said half-axles at said superstructure so as to be displaceable in the longitudinal direction, and connecting linkage means operatively connecting said half-axles to forcibly guide the same, as regards relative movements with respect to the vehicle in the longitudinal direction, substantially in the same direction and substantially by the same amount, said connecting linkage means including a torsion-resistant shaft rotatably mounted on said superstructure and extending substantially in the vehicle transverse direction, arm means rigidly connected to said shaft and extending therefrom on each side of the vehicle, and further connecting rod means extending substantially in the longitudinal direction and pivotally connected at one end thereof with said arm means and at the opposite end thereof with a respective swinging half-axle in proximity to the corresponding wheel, and spring means operatively engaged by said shaft for absorbing said longitudinal forces.

4. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half axles and parallelogram guide means pivotally connected to said half-axles and to said superstructure suspending said half-axles at said superstructure so as to be displaceable in the longitudinal direction, and connecting linkage means operatively connecting said half-axles to forcibly guide the same, as regards relative movements with respect to the vehicle in the longitudinal direction, substantially in the same direction and substantially by the same amount.

5. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half axles and parallelogram guide means pivotally connected to said half-axles and to said superstructure suspending said half-axles at said superstructure so as to be displaceable in the longitudinal direction, connecting means operatively connected with said half-axles to forcibly guide the wheels, as regards relative movements thereof with respect to the vehicle in the longitudinal direction, substantially in the same direction and substantially by the same amount, said connecting means including one linkage part each extending substantially in the longitudinal direction on each side of the vehicle and operatively connected at one end thereof with a pair of the wheel suspension means disposed on the respective side of the vehicle, bell crank means pivotally supported about a substantially vertical axis and having substantially transversely extending arm portions and substantially longitudinally extending oppositely directed arm portions, the other end of a respective linkage part being operatively connected with a corresponding transversely extending arm portion, and a connecting rod operatively connecting the longitudinally extending arm portions.

6. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half-axles and parallelogram guide means pivotally connected to said half-axles and to said superstructure suspending said half-axles at said superstructure so as to be displaceable in the longitudinal direction, connecting means operatively connected with said half-axles to forcibly guide the wheels, as regards relative movements thereof with respect to the vehicle in the longitudinal direction, substantially in the same direction and substantially by the same amount, said connecting means including one linkage part extending substantially in the longitudinal direction on each side of the vehicle and operatively connected at one end thereof with a part of the wheel suspension means disposed on the respective side of the vehicle, bell crank means pivotally supported about a substantially vertical axis and having substantially transversely extending arm portions and substantially longitudinally extending oppositely directed arm portions, the other end of a respective linkage part being operatively connected with a corresponding transversely extending arm portion, and a connecting rod operatively connecting the horizontally extending arm portions, and spring means engaging with the transversely extending arm portions of said bell crank means for absorbing said longitudinal forces.

7. A guide system for vehicles, especially motor vehicles, in which longitudinal forces acting on the wheels of the vehicle are elastically absorbed at the vehicle superstructure, comprising:

wheel suspension means for supporting the two wheels of a pair of oppositely disposed wheels at said vehicle superstructure including swinging half-axles and parallelogram guide means pivotally connected to said half-axles and said superstructure suspending said half-axles at said superstructure so as to be displaceable in the longitudinal direction, and connecting linkage means operatively connecting said half-axles to forcibly guide the same, as regards relative movements with respect to the vehicle in the longitudinal direction, substantially in the same direction and substantially by the same amount, said connecting linkage means including a torsion-resistant shaft rotatably mounted on said superstructure and extending substantially in the vehicle transverse direction, arm means rigidly connected to said shaft and extending therefrom on each side of the vehicle, and further connecting rod means extending substantially in the longitudinal direction and pivotally connected at one end thereof with said arm means and at the opposite end thereof with a respective swinging half-axle in proximity to the corresponding wheel.

References Cited by the Examiner
UNITED STATES PATENTS

| | | | |
|---|---|---|---|
| 1,247,748 | 11/1917 | Trott | 267—41 X |
| 2,152,660 | 4/1930 | Paton | 267—19 X |
| 2,352,053 | 6/1944 | Wilfert et al. | 267—20 X |
| 3,024,040 | 3/1962 | Muller | 280—124 X |
| 3,087,742 | 4/1963 | Muller et al. | 267—20 X |

FOREIGN PATENTS 736,102  9/1932  France.

ARTHUR L. LA POINT, *Primary Examiner.*